United States Patent [19]

Malik

[11] Patent Number: 5,610,803

[45] Date of Patent: Mar. 11, 1997

[54] PULSE WIDTH MODULATED POWER SUPPLY THAT REDUCES OVERSHOOT

[75] Inventor: Randhir S. Malik, Colchester, Vt.

[73] Assignee: International Business Machines Corporation, Armonk, N.Y.

[21] Appl. No.: 324,299

[22] Filed: Oct. 17, 1994

[51] Int. Cl.[6] .................................................. H02M 3/335
[52] U.S. Cl. ................................. 363/21; 363/49; 363/89
[58] Field of Search ..................................... 323/901, 908; 363/21, 53, 49, 56, 75, 89

[56] References Cited

U.S. PATENT DOCUMENTS

| | | | |
|---|---|---|---|
| 5,029,269 | 7/1991 | Elliott et al. | 363/21 |
| 5,140,511 | 8/1992 | Lee et al. | 363/21 |
| 5,373,434 | 12/1994 | Malik | 363/56 |
| 5,498,995 | 3/1996 | Szepesi et al. | 363/21 |

*Primary Examiner*—Peter S. Wong
*Assistant Examiner*—Shawn Riley
*Attorney, Agent, or Firm*—Arthur J. Samodovitz

[57] ABSTRACT

A pulse width modulated power supply minimizes overshoot during start up and when one phase of plural phase power supply resumes after dropping out. The power supply comprises an input transformer having a primary winding, a secondary winding and means for coupling one end of the primary winding to a power source. A switch is connected in series with the primary winding to control power through the primary winding. An output capacitor is coupled to receive current from the secondary winding to develop a DC output voltage. A differential amplifier is coupled to receive a reference voltage at a first input and a voltage based on the output voltage at a second input. A feedback capacitor is coupled between an output of the amplifier and the second input to filter out 120 hertz ripple. An output of the differential amplifier is used to control a duty cycle of the switch. A second capacitor is connected between the output capacitor and the second input of the amplifier to provide current to the second input during start up and/or resumption of the power source. This current delivered via the second capacitor reduces the error voltage during start up and when one power phase resumes after dropping out by reducing the error voltage. Thus, the current delivered via the second capacitor reduces overshoot. During subsequent, steady state conditions, the second capacitor charges to a steady state level and does not affect the error voltage.

11 Claims, 4 Drawing Sheets

PULSE WIDTH MODULATED POWER SUPPLY THAT REDUCES OVERSHOOT

BACKGROUND OF THE INVENTION

The invention relates generally to pulse width modulated power supplies, and deals more particularly with circuitry to prevent overshoot during start up or a single or plural phase power supply and when one phase or a plural phase power supply resumes operation after dropping out.

A standard pulse width modulated power supply for a single phase power source comprises a power train transformer having primary and secondary windings. A full wave rectifier bridge is connected to the power source. One end of the primary winding is connected to an output of the full wave rectifying bridge and the other end is connected to a semiconductor switch. The switch is repeatedly turned on and off to develop a high frequency voltage across the primary winding. A half or full wave rectifier bridge is connected across the secondary winding and charges an output capacitor to supply output DC voltage.

One prior art technique to control the switch uses a differential amplifier that receives at one input a fixed reference voltage and at the other input a fraction of the DC output voltage. A feedback capacitor is connected between the output of the amplifier and one of the inputs to filter out 120 hertz ripple. The output of the differential amplifier is called an "error voltage" and is proportional (after the time constant of the feedback capacitor is satisfied) to the difference between the fractional output voltage and the reference voltage. The voltage at the output of the amplifier (developed on the feedback capacitor) is supplied to one input of a comparator. The other input is supplied by the voltage across a timing capacitor which is charged by rectified current from a secondary of another current sense transformer. When the voltage across the timing capacitor just exceeds the error voltage, the comparator resets a flip flop which shuts off the switch (until the next cycle of a clock which sets the flip flop). Thus, the greater the error voltage the greater the duty cycle. Also, the flip flop activates a transistor to reset the timing capacitor in preparation for the next cycle.

The time constant of the differential amplifier and associated feedback capacitor is large, for example, 100 milliseconds, because it must be much larger than the period of the 120 hertz ripple for proper operation of a bulkless AC/DC converter. This leads to an overshoot problem during start up of a single or plural phase power supply and during resumption of one input phase in a plural phase power source.

Accordingly, a general object of the present invention is to provide a single or plural phase, pulse width modulated power supply which avoids overshoot during start up and when one phase or a plural phase power source resumes after dropping out.

SUMMARY OF THE INVENTION

The invention resides in a pulse width modulated power supply which minimizes overshoot during start up and when one phase of plural phase power supply resumes after dropping out. The power supply comprises an input transformer having a primary winding, a secondary winding and means for coupling one end of the primary winding to a power source. A switch is connected in series with the primary winding to control power through the primary winding. An output capacitor is coupled to receive current from the secondary winding to develop a DC output voltage. A differential amplifier is coupled to receive a reference voltage at one input and a voltage based on the output voltage at another input. A feedback capacitor is coupled between an output of the amplifier and said other input to filter out 120 hertz ripple. An output of the differential amplifier is used to control a duty cycle of the switch. A second capacitor is connected between the secondary winding and said other input of the amplifier (for example, between the output capacitor and said other input of the amplifier) to deliver current from the secondary winding to said other input during start up and/or resumption of the power source. This current delivered via the second capacitor reduces the error voltage during start up and when one power phase resumes after dropping out by reducing the error voltage. Thus, the current delivered via the second capacitor reduces overshoot. During subsequent, steady state conditions, the second capacitor charges to a steady state level and does not affect the error voltage.

According to another feature of the invention, a reset switch is coupled to discharge the second capacitor pursuant to termination of the power source.

DETAILED DESCRIPTION OF THE PREFERRED EMBODIMENT

Figure 1:
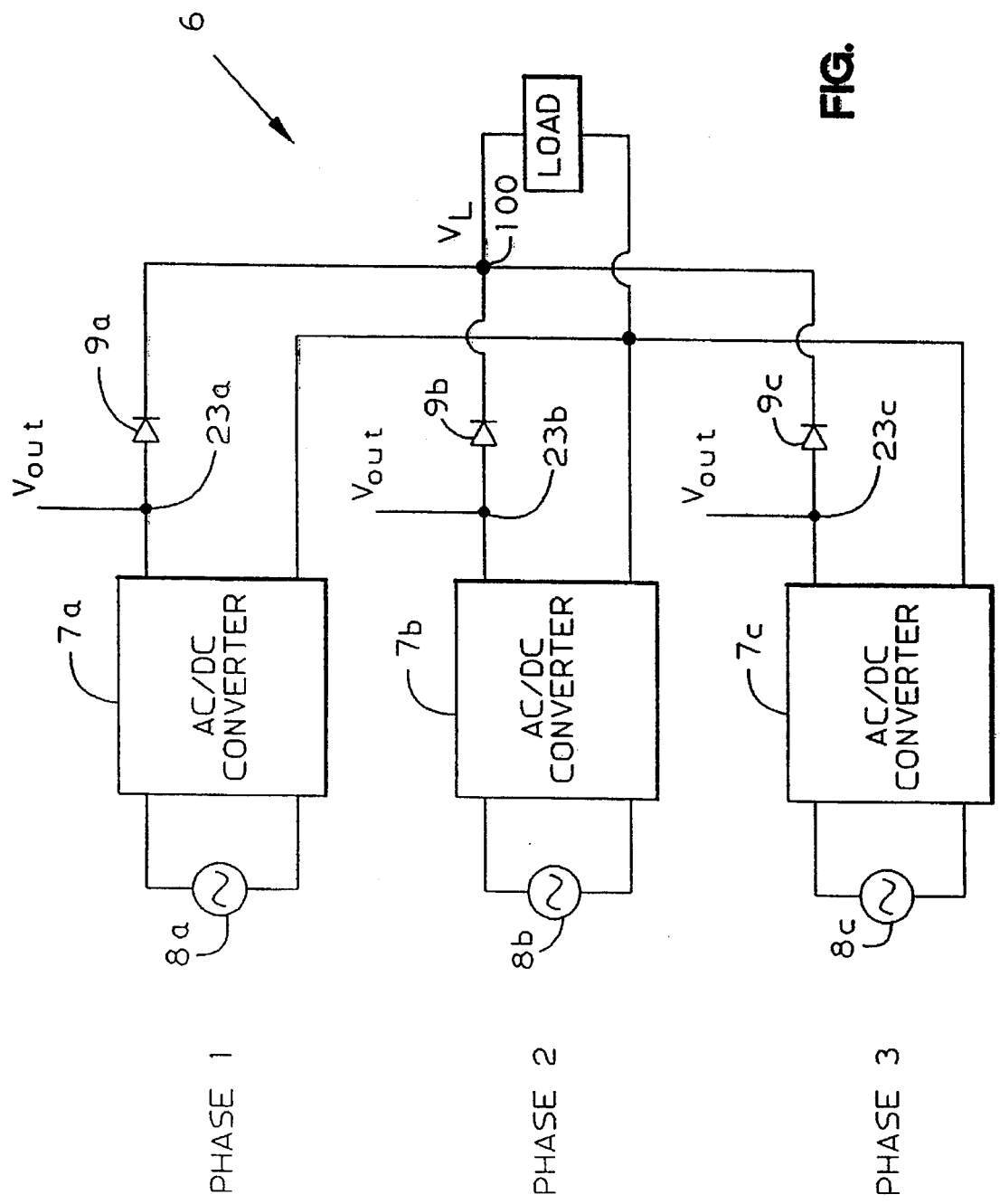
FIG. 1 is a block diagram of a three phase pulse width modulated power supply according to the present invention.

FIG. 1 illustrates, in block form, a three phase, pulse width modulated power supply generally designated 6 according to the present invention. Power supply 6 comprises three identical AC/DC power converters 7a,b,c, three respective input power phases 8a,b,c and three respective output series diodes 9a,b,c connected between the respective power converter outputs 23a,b,c (Vout) and a common load output (VL) 100.

Figure 2A:
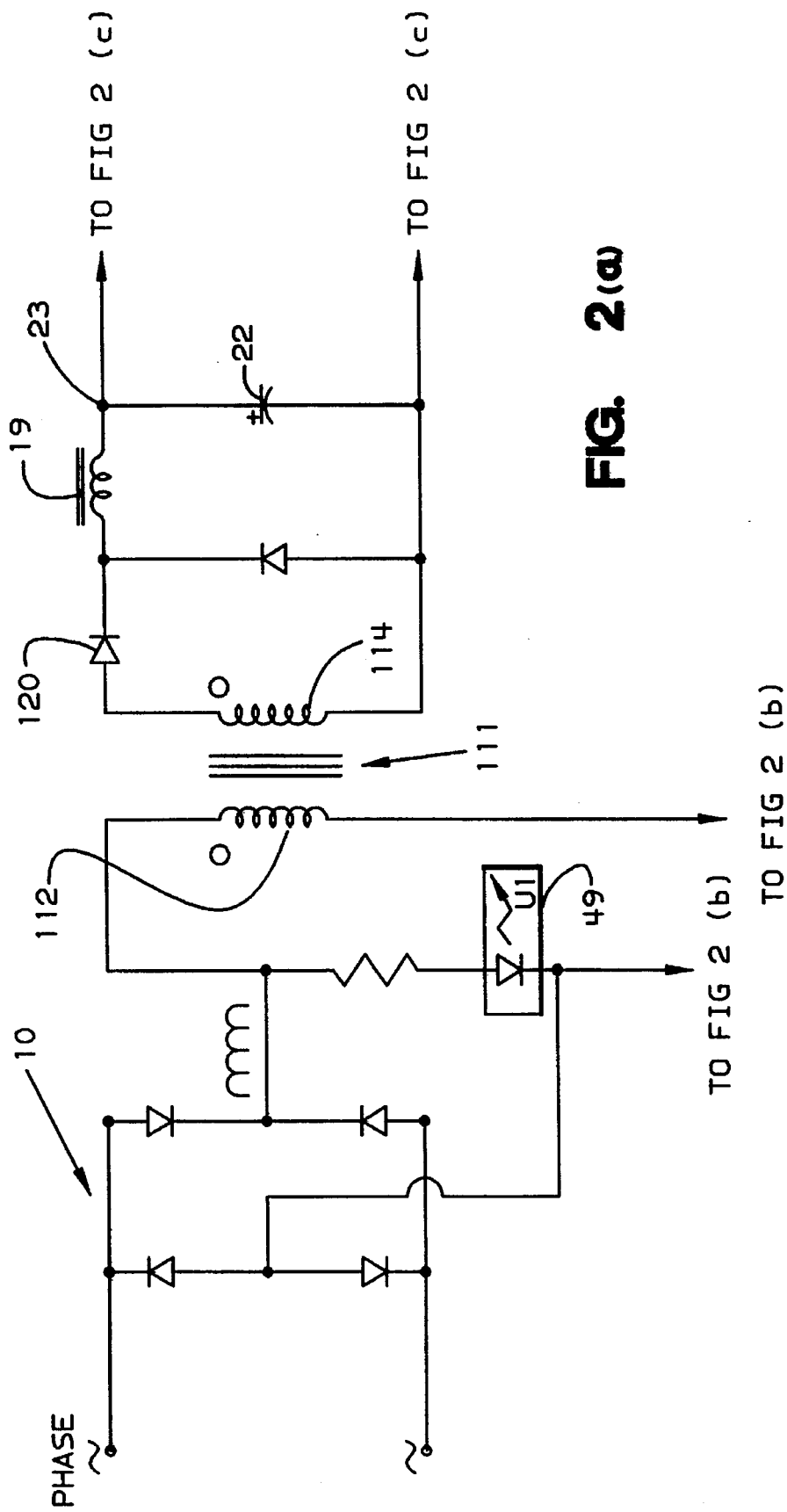
FIGS. 2a–c are a circuit diagram of one of three identical AC/DC converters (for one of the three phases) within the power supply of FIG. 1. The AC/DC converter of FIGS. 2a–c can also operate as a standalone single phase power supply.
Figure 2B:
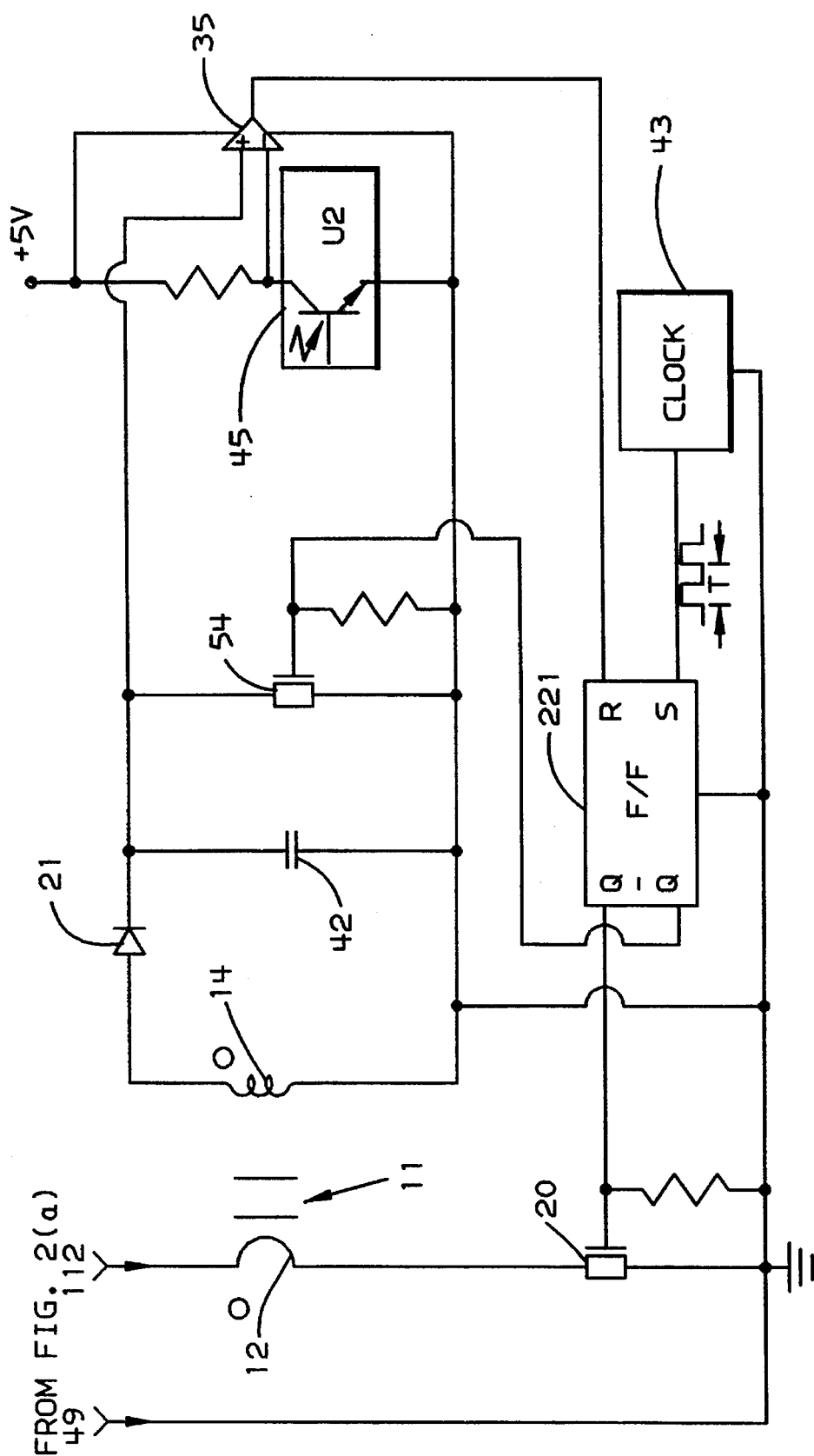
Figure 2C:
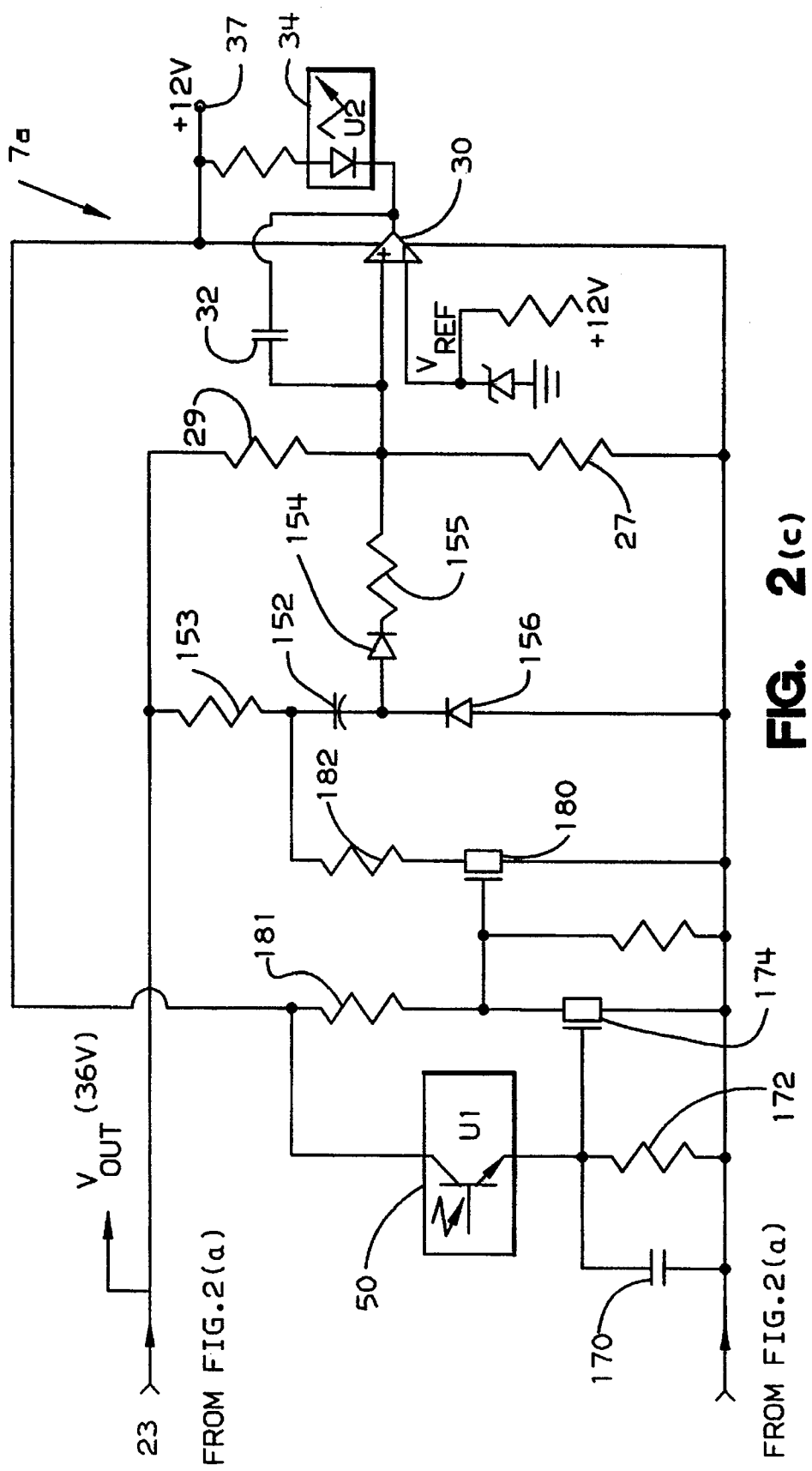

As illustrated in FIG. 2, each of the AC/DC power converters comprises a full wave rectifier bridge 10 to rectify the respective input voltage phase, a power transformer 111 and a series, current sense transformer 11. Sense transformer 11 has a primary winding 12 and a secondary winding 14 and transformer 111 has a primary winding 112 and a secondary winding 114. Power transformer 111 is part of a power train 116 which culminates in a DC output capacitor 22, and transformer 11 is part of pulse width modulating control circuit for the power train. The full wave rectified output of the bridge 10 is connected to one end of the series primary windings 112 and 12, and a transistor switch 20 is connected to the other end. The control circuit controls the duty cycle of switch 20 as described in more detail below to regulate the amount of power delivered to transformers 111 and 11.

Within the power train, rectifiers 120 and 121 and a low pass filter comprising a series inductor 19 and parallel, output capacitor 22 are connected across the secondary winding 114. A DC output voltage 23 with some 120 hertz ripple (for example, 2%) is developed across the output capacitor 22 based on the duty cycle of switch 20 as described below.

Within the control circuit, a rectifier 21 and a parallel, timing capacitor 42 are connected across the secondary winding 14. A flip flop 221 has a set input which is supplied by a clock 43. When clock 43 outputs a positive pulse, the flip flop turns on switch 20. This causes voltage to be applied across transformers 111 and 11, and charging current to be delivered to output capacitor 22 and timing capacitor 42. The control circuit uses the DC output voltage 23 for regulation as follows. The DC output voltage is divided by resistors 27 and 29 and supplied to one input of a differential amplifier 30. The other input is supplied by a reference voltage developed across a zener diode 31. Initially, the reference voltage is much greater than the divided DC output voltage because the output capacitor 22 cannot charge instantaneously. However, the actual difference is reduced by the following circuitry. As long as the input voltage phase is present, current flows through an LED 49. This activates an associated photo sensitive transistor 50 which quickly charges a capacitor 170 (for example, 470 pfs.) to a level which activates transistor 174. The activated transistor 174 decreases the voltage at the gate of transistor 180 thereby turning off transistor 180. With transistor 180 turned off, additional current is supplied to the inverting input of amplifier 30 via a resistor 150 (for example, 1000 ohms), capacitor 152 (for example, 4.7 uf.), diode 154 and resistor 155 (for example, 1K ohms). This reduces the differential input to amplifier 30 compared to the difference that would result without the resistor 150, capacitor 152, diode 154 and resistor 155 path. Consequently, the differential amplifier 30 outputs a corresponding, small positive voltage which charges a feedback capacitor 32. The feedback capacitor 32 (with series resistor 29) is necessary to filter out the 120 hertz ripple at the output voltage 23. The RC time constant, for example, 22 ms., of capacitor 32 and resistor 29, slows the response of differential amplifier 30 and the voltage across capacitor 32 slowly rises. However, the effect of lead network consisting of resistor 153, capacitor 152, diode 154 and resistor 155 is to charge the input end of capacitor C32 at a much faster rate initially.

Thus, the differential amplifier 30 initially outputs a low positive voltage during start up because of the low differential voltage at its input. This results in a large current flowing from twelve volt source 37 into LED 34. This large current results in a high conduction of an associated photosensitive transistor 45. This causes a low voltage to be developed across photosensitive diode 45 and supplied to the inverting input of comparator 35 as a reference voltage.

During this cycle of activation of switch 20, current flows through transformer 111 into the power train and through current sense transformer 11 of the control circuit. This current into transformer 11 causes a current to flow through rectifier 21 and into timing capacitor 42 to charge capacitor 42. Timing capacitor 42 is much smaller than output capacitor 22 and has a smaller time constant than output capacitor 22. When the voltage across capacitor 42 exceeds the reference voltage across photosensitive transistor 45, the output of comparator 35 goes high and resets flip flop 221 which turns off switch 20. (Also, when the voltage of timing capacitor 42 exceeds the reference voltage and the switch is shut off by the Q output of flip flop 221, the Q not output of flip flop 221 also activates N channel transistor 54 to reset the timing capacitor 42 for the next cycle.) Because the reference voltage at the inverting input of comparator 35 is low, the time required for the timing capacitor to exceed the reference voltage is short, the switch 20 is protected against overheating and the output capacitor 22 obtains some charge during this cycle.

Because of the large size and time constant of output capacitor 22, capacitor 22 retains substantially all of its charge when switch 20 is turned off for the remainder of the clock cycle. Switch 20 remains turned off until the next, second cycle of clock 43. At that time, flip flop 21 is set again and turns on switch 20. This causes additional power to be delivered to transformers 111 and 11, and current to be delivered to the output capacitor 22 and timing capacitor 42. Because the DC output voltage divided by resistors 27 and 29 augmented by the current through resistor 150, capacitor 152, diode 154 and resistor 155 is still less than the reference voltage across zener diode 31 and because of the time constant of feedback capacitor 32, differential amplifier 30 still outputs a small, positive DC voltage and continues to deliver additional current to feedback capacitor 32. At this time the voltage at the output of the differential amplifier is greater than during the first cycle because of the continuous charging of feedback capacitor 32. Thus, the current through LED 34 is less than during the first cycle. This reduces the conduction of photosensitive diode 45 and consequently increases the reference voltage applied to the inverting input of comparator 35.

Capacitor 42 still charges much faster than capacitor 32 and eventually overtakes the reference voltage at the inverting input of comparator 35; however the time required is greater (but still safe for switch 20) during this second cycle than during the first cycle because the reference voltage at the inverting input of comparator 35 is now higher. Thus, a greater amount of current is delivered to the output capacitor 22 during the second cycle than during the first. When the voltage across timing capacitor 42 exceeds the reference voltage at the inverting input of comparator 35, the output of comparator 35 goes high and resets flip flop 221 which turns off switch 20. The foregoing process is repeated many times, until steady state occurs. During steady state, capacitor 152 is fully charged and ceases to pass any current to the inverting input of amplifier 30. It should be noted that because of the additional current supplied via resistor 150, capacitor 152, diode 154 and resistor 155 during start up, the duty cycle of switch 20 was always short enough to prevent excess current flow in and heating of switch 20.

Also, when the voltage output from differential amplifier 30 reaches steady state (for constant load), there is a steady state reference voltage at the inverting input of comparator 35 and constant duty cycle of switch 20. If the load demand increases, the output voltage 23 will decrease slightly. This will reduce the divided voltage at the inverting input of the differential amplifier 30 and increase the output of differential amplifier 30. This will decrease the current through LED 34 and photosensitive transistor 45. This will increase the reference voltage at the input of comparator 35 and the duty cycle of switch 20 to supply the extra load current and increase the output voltage 23 to the rated level. The converse also occurs when the load current decreases.

If the line voltage decreases, this will reduce the divided voltage at the inverting input of differential amplifier 30. This will increase the output of the differential amplifier 30, reduce the current through LED 34 and photosensitive transistor 54. This will increase the reference voltage at the inverting input of comparator 35 and therefore increase the duty cycle of switch 20. This will tend to increase the output voltage 23. The converse also occurs when the line voltage increases.

The foregoing current path via resistor 150, capacitor 152, diode 154 and resistor 155 also prevents overshoot when one input power phase resumes after dropping out. If the input voltage for one phase "drops out", the respective inductor 19 will temporarily support the respective output voltage 23. However, when the energy in the inductor 19 dissipates, the output voltage will decrease rapidly until the respective diode 9 is reversed biased. Then, the voltage of the respective output capacitor will decrease slowly as determined by the magnitude of capacitor 22 and the magnitudes of resistors 150, 155, 27 and 29. Likewise, the voltage of capacitor 152 would decrease slowly if not for additional reset operation provided by transistors 50, 174 and 180 as described below. This additional reset circuit is necessary because the circuit path of resistor 150, capacitor 152, diode 154 and resistor 155 is only effective in reducing overshoot when capacitor 152 is substantially discharged at start up or resumption.

When the input voltage phase drops out, current ceases to flow through LED 49. This shuts off charging current to capacitor 170, and capacitor 170 begins to discharge through resistor 172. The time constant of this discharge, for example, 20 ms., is sufficiently large to ignore a 100% dip in the input voltage, but small enough such that when the input voltage phase drops out for few cycles, the voltage across capacitor 170 drops below the activation level for transistor 174. De-activation of transistor 174 permits activation current to flow into the gate of transistor 180 via a resistor 181, and transistor 180 discharges capacitor 152 via a resistor 182 in preparation for the subsequent resumption of input voltage. The magnitude of resistor 182 is small enough, for example, 1 K ohms, to cause sufficient discharge of capacitor 152 to affectively avoid overshoot during the resumption of input voltage if such resumption occurs many cycles later. However, the magnitude of resistor 182 is large enough such that the time constant of capacitor 152 in series with resistor 182 will not cause substantial discharge of capacitor 152 in a few cycles. Such discharge would slow the response time of returning to rated output voltage if the input voltage were to resume after only a few cycles; in such a case, overshoot is not a problem because the output voltage 23 would not have dropped to a level to invite overshoot.

Based on the foregoing, single and plural phase, pulse width modulated power supplies according to the present invention have been disclosed. However, numerous modifications and substitutions can be made without deviating from the scope of the present invention. Therefore, the invention has been disclosed by way of illustration and not limitation and reference should be made to the following claims to determine the scope of the present invention.

I claim:

1. A pulse width modulated power supply comprising:

an input transformer having a primary winding, a secondary winding and means for coupling one end of the primary winding to a power source;

a switch connected in series with said primary winding to control power through the primary winding;

an output capacitor coupled to receive current from said secondary winding to develop a DC output voltage;

a differential amplifier having a first input coupled to receive a reference voltage and a second input coupled to receive a voltage based on the output voltage;

a feedback capacitor coupled between an output of said differential amplifier and said second input, said output of said differential amplifier controlling a duty cycle of said switch; and a third capacitor connected between said secondary winding and said second input to deliver current from said secondary winding to said second input and said feedback capacitor during start up of said power source to reduce said duty cycle during said start up.

2. A power supply as set forth in claim 1 wherein said third capacitor is connected between said output capacitor and said second input.

3. A power supply as set forth in claim 1 further comprising a reset switch coupled to discharge said third capacitor pursuant to termination of the power source.

4. A power supply as set forth in claim 3 wherein said reset switch is coupled to block the discharge of said third capacitor after the power source resumes.

5. A power supply as set forth in claim 1 further comprising means for discharging said third capacitor when said power source is absent for a multiplicity of cycles.

6. A power supply as set forth in claim 5 wherein said power source is one phase of a plural phase power supply and said discharging means discharges said third capacitor if said one phase is absent for a multiplicity of cycles.

7. A power supply as set forth in claim 1 further comprising a timing capacitor, means for charging said timing capacitor when said switch is turned on, and means for turning said switch off when a voltage of said timing capacitor reaches a threshold level based on said output of said differential amplifier.

8. A power supply as set forth in claim 7 wherein the charging means comprises a sense transformer in series with said input transformer, and a rectifier connected to a secondary winding of said sense transformer and wherein said timing capacitor is coupled to said rectifier to receive charging current.

9. A power supply as set forth in claim 7 further comprising a comparator having one input at said threshold level and another input supplied by said timing capacitor, and an output which controls said switch connected in series with said primary winding.

10. A power supply as set forth in claim 1 further comprising a full wave rectifier bridge connected between a source of AC current and said primary winding.

11. A power supply as set forth in claim 1 wherein said feedback capacitor has a time constant substantially greater than $\frac{1}{60}$ second.

* * * * *